United States Patent
Hsu

(10) Patent No.: US 7,910,250 B2
(45) Date of Patent: Mar. 22, 2011

(54) SYSTEM AND METHOD FOR RECHARGING A METAL-AIR CONVERTER USED FOR VEHICLE PROPULSION

(75) Inventor: Michael S. Hsu, Lincoln, MA (US)

(73) Assignee: Ztek Corporation, Woburn, MA (US)

( * ) Notice: Subject to any disclaimer, the term of this patent is extended or adjusted under 35 U.S.C. 154(b) by 1449 days.

(21) Appl. No.: 10/523,372

(22) PCT Filed: Aug. 8, 2003

(86) PCT No.: PCT/US03/25041
§ 371 (c)(1),
(2), (4) Date: Nov. 1, 2005

(87) PCT Pub. No.: WO2004/015799
PCT Pub. Date: Feb. 19, 2004

(65) Prior Publication Data
US 2006/0099472 A1  May 11, 2006

Related U.S. Application Data

(60) Provisional application No. 60/402,447, filed on Aug. 8, 2002.

(51) Int. Cl.
*H01M 8/06* (2006.01)
*H01M 12/06* (2006.01)
*B60K 1/00* (2006.01)

(52) U.S. Cl. ............... 429/403; 429/402; 180/65.31; 180/65.21; 307/66

(58) Field of Classification Search ............ None
See application file for complete search history.

(56) References Cited

U.S. PATENT DOCUMENTS

| 3,517,766 | A | * | 6/1970 | De Witt | 180/65.245 |
|---|---|---|---|---|---|
| 4,081,693 | A | | 3/1978 | Stone | |
| 4,237,410 | A | | 12/1980 | Erickson et al. | |
| 5,693,201 | A | | 12/1997 | Hsu et al. | |
| 5,858,568 | A | * | 1/1999 | Hsu et al. | 429/13 |
| 5,976,332 | A | | 11/1999 | Hsu et al. | |
| 6,193,929 | B1 | | 2/2001 | Ovshinsky et al. | |

FOREIGN PATENT DOCUMENTS
EP    0578837 A1    1/1994
* cited by examiner

*Primary Examiner* — John S Maples
(74) *Attorney, Agent, or Firm* — Nelson Mullins Riley & Scarborough LLP; Anthony A. Laurentano, Esq.

(57) ABSTRACT

A power supply system for powering an electric motor (16) in an electric vehicle includes a metal-air converter (12) connected to the motor (16) for driving the motor (16) and a generator (10) connected to the metal-air converter (12) for recharging the metal-air converter (12). The generator (10) may also directly provide electricity to the motor (16) simultaneously with the metal-air converter (12). The system further includes a structure for providing a supply of fuel to the generator (10) that in turn converts the fuel to electricity.

8 Claims, 2 Drawing Sheets

US 7,910,250 B2

SYSTEM AND METHOD FOR RECHARGING A METAL-AIR CONVERTER USED FOR VEHICLE PROPULSION

RELATED APPLICATIONS

The present application claims priority to U.S. Provisional Patent Application Ser. No. 60/402,447, filed Aug. 8, 2002 and entitled "Fuel Cell/Metal-Air Converter for Automotive Propulsion", the contents of which are herein incorporated by reference.

FIELD OF THE INVENTION

The present invention relates generally to the field of vehicle propulsion systems. In particular, the present invention relates to an electric vehicle propulsion system including an on-board power source in combination with a battery.

BACKGROUND OF THE INVENTION

As concerns surrounding traditional energy sources persist, investigation into alternative forms of energy are becoming increasingly important. In particular, environmental and political concerns associated with emissions of combustion based energy systems can not be ignored. In an effort to reduce dependence on these types of energy supplies and methods, therefore, the focus is likely to be on devices capable of generating electricity by consuming plentiful or renewable supplies of fuels with low or zero emissions.

Alternatives to internal combustion engine powered vehicles have included various types of battery powered electric vehicles. Batteries are commonly used electrical energy sources. A battery contains a negative electrode, typically called the anode, and a positive electrode, typically called the cathode. The anode contains an active material that can be oxidized; the cathode contains or consumes an active material that can be reduced. The anode active material is capable of reducing the cathode active material. In order to prevent direct reaction of the anode material and the cathode material, the anode and the cathode are electrically isolated from each other by a separator.

When a battery is used as an electrical energy source in a device, such as a vehicle, electrical contact is made to the anode and the cathode, allowing electrons to flow through the device and permitting the respective oxidation and reduction reactions to occur to provide electrical power. An electrolyte in contact with the anode and the cathode contains ions that flow through the separator between the electrodes to maintain charge balance throughout the battery during discharge.

A problem associated with most known battery powered vehicles, however, is the constant need for recharging, due to the limited amount of energy a battery can hold in a single charge. In the current state of the art, recharging a battery requires taking the vehicle out of service. Current methods of recharging require the vehicle to be brought to a standstill, and are time-consuming and tedious, particularly since they must be performed frequently.

Fuel cells, therefore, have been explored as a means for powering electric vehicles and reducing the constant need to recharge the vehicle from off-board sources. Fuel cells electrochemically convert hydrocarbons or hydrogen to electricity with low or zero emissions. Because they are compact in structure, high in efficiency, and low in pollutants, fuel cells provide several advantages for use in vehicle transportation. Accordingly, fuel cells appear to be well suited for adaption to vehicle applications.

A drawback associated with known fuel cell systems, however, is that they are not economically viable for applications in which the power rating of the fuel cell must meet propulsion demands. In motor vehicle applications, for example, a fuel cell system designed to provide sufficient power required by the vehicle for cruising, let alone for peak surge, would be prohibitively expensive. While various known systems have attempted to exploit the advantages of designating a surge battery to meet peak demand in motor vehicle applications, none has satisfactorily overcome the size-constraints for on-board integration.

SUMMARY OF THE INVENTION

The present invention provides hybrid vehicle propulsion system for powering a vehicle. The system includes a metal-air converter connected to an electric motor in the vehicle for propulsion of the vehicle. The metal-air converter generates electricity for driving the motor by reacting a metal, such as zinc, with air to produce a metal oxide and release electrons to generate electricity. An on-board generator is connected to the metal-air converter for recharging the metal-air converter. The system further includes a structure for supplying fuel to the generator that in turn converts the fuel to electricity.

The hybrid vehicle propulsion system has a range comparable with that of traditional combustion engines without requiring frequent interruptive recharging from off-board sources. The hybrid propulsion system is economically feasible and can accommodate typical surge and range demands of a vehicle.

By integrating a generator as an on-board recharging system for a metal-air converter powered electric vehicle, the range of the vehicle can be extended to over 300 miles. This is competitive with vehicles powered by traditional combustion engines and greatly improves the commercial viability of battery-powered electric vehicles. Improved system weight is also achieved by using a metal-air battery, which has much higher energy and power density by volume or weight than the traditional lead acid battery or other advanced batteries.

DETAILED DESCRIPTION OF THE INVENTION

Figure 1:
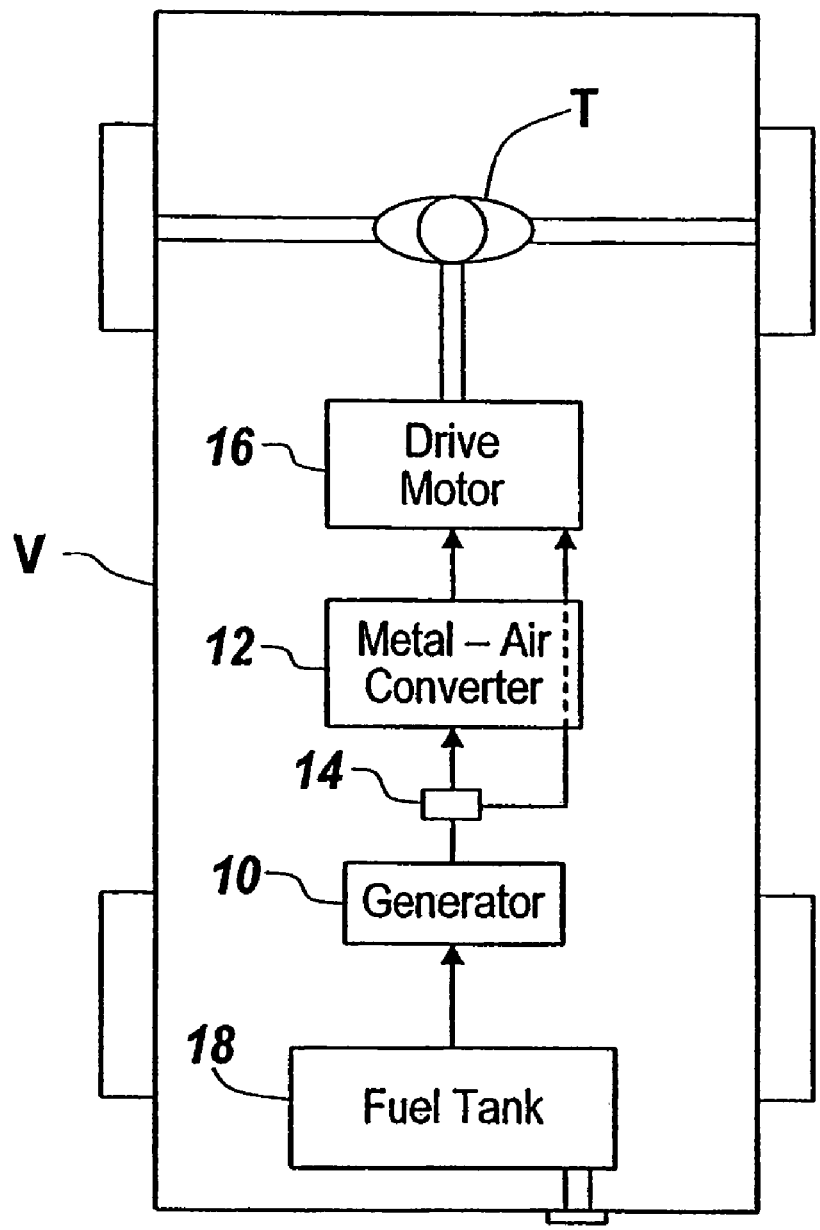
FIG. 1 is schematic diagram of an electric vehicle constructed in accordance with the teachings of the present invention.

The present invention provides a hybrid propulsion system for a vehicle that employs a rechargeable metal-air converter coupled to a generator for powering a driving motor. The generator also serves to provide on-board recharging of the metal-air converter. The present invention will be described below relative to an illustrative embodiment. Those skilled in the art will appreciate that the present invention may be implemented in a number of different applications and embodiments and is not, specifically limited in its application to the particular embodiments depicted herein.

A metal-air electrochemical converter is a type of battery that uses a metal fuel to produce energy. In conventional metal-air electrochemical converters, the energy released by the metal fuel is based on well known electrochemistry principles. In a metal-air electrochemical converter, oxygen is supplied to the cathode of the converter from the atmospheric air external to the converter through one or more air access opening(s). A metal fuel, e.g., zinc, aluminum, magnesium, lithium, iron, calcium or another suitable metal, is made available to the anode of the converter, or the anode is formed of the metal fuel. As a load is imposed on the converter, the metal is converted to metal oxide with a corresponding release of electrons, which provide electricity. For example, in the specific case of zinc being used as the metal fuel, the overall reaction is:

The reaction for aluminum, magnesium, lithium, iron, calcium and other metals for a metal-air converter is similar.

A metal-air converter is rechargeable by providing an electric charge from an off-board source to reverse the electrochemical process, or by supplying new metal fuel to replace the spent metal fuel.

Electric vehicles are well known in the art. For example, typical electric vehicles can be powered by nickel-cadmium batteries, which power electric motors of anywhere from twenty to over two-hundred horsepower. The batteries are generally rechargeable by off-board DC power supplies. A problem with known systems, however, is that they offer limited range between required recharging stops. Most known battery powered vehicles require frequent recharging and have a severe limitation in the range of travel, typically less than 100 miles. Solar rechargeable systems can reduce the need for frequent off-board recharging. However, drawbacks associated with the solar generation of electricity include its usefulness being limited to clear weather and daylight hours.

The present invention provides a hybrid propulsion system that is suitable for powering an electric motor in an electric vehicle. According to an illustrative embodiment of the invention, an electric vehicle includes a rechargeable metal-air converter, illustrated as a metal-air battery, together with an on-board generator, for powering the motor of the vehicle. The on-board generator is also connected to the metal-air converter for recharging the metal-air converter to extend the distance the vehicle can-travel without requiring the vehicle to stop for refueling, recharging or replacement of the metal-air converter. The term "generator" as used herein is intended to include general types of power-sources for supplying energy to or on-board a mobile vehicle, such as fuel cells, internal combustion engines, sand solar cells, as well as gas and steam turbines of micro and macro sizes and combinations thereof. The integration of fuel cells with a gas turbine, including both micro and macro gas turbines, is clearly set forth in U.S. Pat. No. 5,693,201 and U.S. Pat. No. 5,976,332, to the assignee hereof, the contents of which are herein incorporated by reference. The term "metal-air converter" as used herein refers to a device that releases electrons to produce electricity by converting a metal in a metal fuel to a metal oxide. Examples include, but are not limited to: a zinc-air battery, an aluminum-air battery, a magnesium-air battery, a lithium-air battery, an iron-air battery and a calcium-air battery. Metal-air battery having an anode formed of a material including a metal that releases electrons when oxidized. A "metal-air battery" is a battery having an anode that is formed of a metal (or a material including metal) that releases electrons when oxidized.

Accordingly, FIG. 1 is a block diagram of an electrically powered vehicle V including the improved propulsion system of an illustrative embodiment of the present invention. The system includes a generator 10, which is electrically and/or mechanically coupled or connected to a rechargeable metal-air converter 12. As shown, the metal-air converter 12 is connected or coupled to an electric motor 16, which drives a motor vehicle drive train T. A fuel supply tank 18 is also provided on-board the vehicle for delivering a supply of fuel to the generator 10. Arranged between the generator 10 and the battery 12 can be an optional voltage regulator 14. The generator 10 may be connected to the motor via the voltage regulator, as shown. For purposes of illustration, the generator 10, metal-air converter 12, and electric motor 16 are shown as being interconnected in series. However, the specific arrangement of the illustrated components and other circuitry or parts are well known to those skilled in the art of motor vehicles in general and electrically powered motor vehicles in particular.

The generator 10, under steady operation, may be primarily utilized for on-board recharging of the metal-air converter 12, and can also, be used to power the motor. The generator 10 receives generator fuel from the fuel supply tank 18 and converts the generator fuel, in a manner described in greater detail herein below, to produce electricity for recharging the converter 12, which is typically under a variable load demand, depending on the terrain, the speed of the vehicle, the driving requirements and environment, and so on. Positive and negative electrical leads of the generator 10 are connected to corresponding leads on the converter 12 to transfer recharging energy, as required, from the generator 10 to the metal-air converter 12. According to an illustrative embodiment, the generator 10 may also directly provide power to the electric motor 16. By integrating a continuous output, on-board power-supply, i.e., the generator, with an electric vehicle, the hybrid propulsion system of the present invention significantly reduces or eliminates the dependence of such vehicles on off board-recharging.

In one embodiment of the invention, the generator 10 comprises a fuel cell, such as a proton electrolyte membrane (PEM) fuel cell. Solid oxide fuel cells, molten carbonate fuel cells, phosphoric acid fuel cells and alkaline fuel cells are suitable as well. Other types of fuel cells will be apparent to those skilled in the art. Suitable fuel cells are described at least for example in U.S. Pat. No. 5,332,630, the contents of which are herein incorporated by reference. Other suitable fuel cells are described, for example, in U.S. Pat. No. 4,614,628 (Sep. 30, 1986 to Hsu et al.), U.S. Pat. No. 4,721,556 issued to Hsu on Jan. 26, 1988, U.S. Pat. No. 4,853,100 issued to Hsu on Aug. 1, 1989, U.S. Pat. No. 5,462,817, U.S. Pat. No. 5,501,781, U.S. Pat. No. 5,693,201, U.S. Pat. No. 5,976,332, U.S. Pat. No. 5,833,822, U.S. Pat. No. 5,747,185, U.S. Pat. No. 5,948,221, U.S. Pat. No. 5,858,568 and U.S. Pat. No. 6,083,636. The contents of the foregoing references are hereby incorporated herein by reference.

Figure 2:
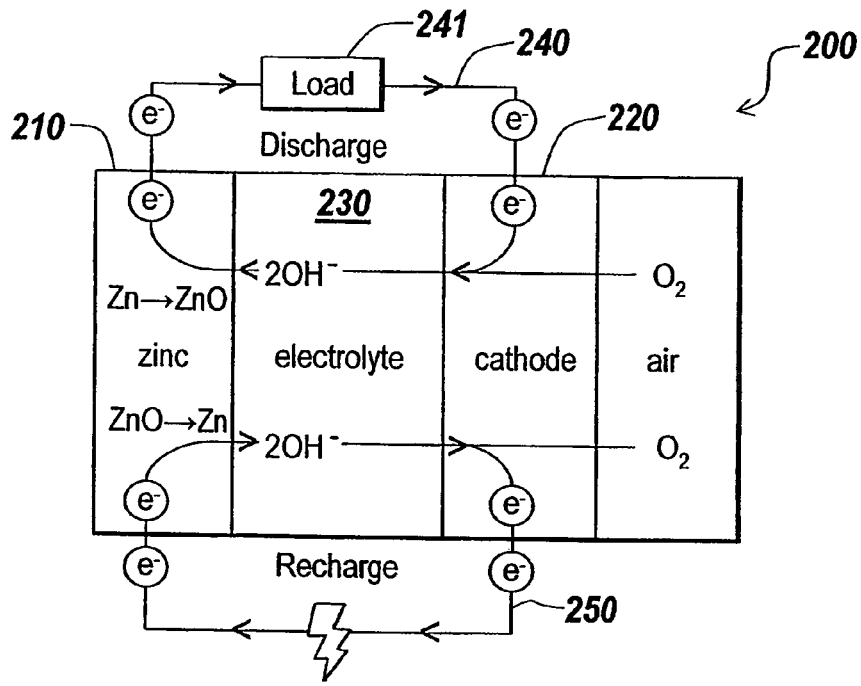
FIG. 2 is a schematic diagram of a metal-air converter suitable for use in the electric vehicle of FIG. 1.

The metal-air converter can comprise a zinc-air converter, aluminum-air, magnesium-air and other converter types. Suitable metal-air converters are available from eVionyx, of Hawthorne, N.Y., USA. FIG. 2 is a schematic drawing of an example of a zinc-air battery 200 suitable for use in the electric vehicle of FIG. 1. One skilled in the art will recognize that the zinc-air battery is an example of one of many types of metal-air converters that may be implemented in the hybrid propulsion system of the present invention and that the invention is not limited to the illustrative metal-air converter. The metal-air converter of the present invention can include any compact lightweight converter suitable for operating with a generator, such as a fuel cell in an electric vehicle. According to an illustrative embodiment, the metal-air converter used in the present invention has an energy-density greater than 200 Wh/kg or 500 Wh/l and power density greater than 200 W/kg or 500 W/l, though one skilled in the art will recognize that the invention is not limited to these ranges.

As shown, the zinc-air battery 200 includes an anode 210 formed of zinc, a cathode or air electrode 220 made of a porous carbon structure or metal mesh covered with a proper catalyst and an electrolyte 230. The electrolyte comprises a liquid or solid polymer membrane material that conducts OH— ions, such as KOH. As the zinc reacts with the oxygen supplied from the cathode to form zinc oxide, electrons are released. The anode 210 and the cathode 220 connect to a discharge circuit 240, which conducts the generated electrons from the anode to a load 241.

As shown in FIG. 2, to enhance the cost-efficiency of the metal-air converter, the metal fuel may be regenerated from the metal oxide by a chemical recycling process, to extend the lifetime of the converter. For example, in the illustrative zinc-air battery 200, the anode and cathode also connect to a recharging circuit 250, which converts the zinc oxide produced by the electrochemical reaction back to zinc to recharge the battery. The recharging circuit recharges the battery by applying an electric charge to the zinc oxide to reverse the electrochemical reaction. The converted zinc may then be reused to produce additional electrons.

The use of a metal type fuel for powering the electric motor provides favorable economic scale while concomitantly providing flexibility in the manner and type of use. In the specific case of zinc as a fuel, zinc ore is abundantly available and is mined and converted to relatively low-cost zinc metal. Within the converter, energy is extracted from the zinc as it is electrochemically converted to zinc oxide. Metal-air converters also have a high energy-to-weight ratio, are compact, are safe to use, and are relatively inexpensive. Metal-air converters also do not cause the harmful environmental effects associated with other fuels, as no toxic byproducts are produced by the chemical reaction.

Several commercially attractive options exist which help in lowering the cost of the original zinc fuel. These options include recharging the converter, which converts the zinc oxide back to zinc metal, or reclaiming or reprocessing the zinc oxide for use in other industries (e.g. pharmaceuticals or agricultural industries). Some benefits of the using a metal fuel converter include that it is refuelable, rechargeable, and does not generate harmful emissions or by-products. Moreover, the converter provides more power and energy than any current or foreseeable technology. Further, the converter can be operated at room temperatures and pressures, is environmentally friendly, abundant and recyclable.

In the current state of the art, delivering a metal fuel or electric charge to a metal-air converter to replenish a metal fuel supply is difficult, unwieldy and inefficient. Prior metal-air converters rely on replenishing the metal fuel or providing an electric charge at an off-board refueling or recharging station. For wide spread use, a metal-air converter used as a propulsion source requires many accessible service stations dedicated to refueling and recharging of metal-air converters. Additionally, the metal fuel is significantly more expensive, by a factor of five, than conventional fuels, such as gasoline and natural gas.

Figure 3:
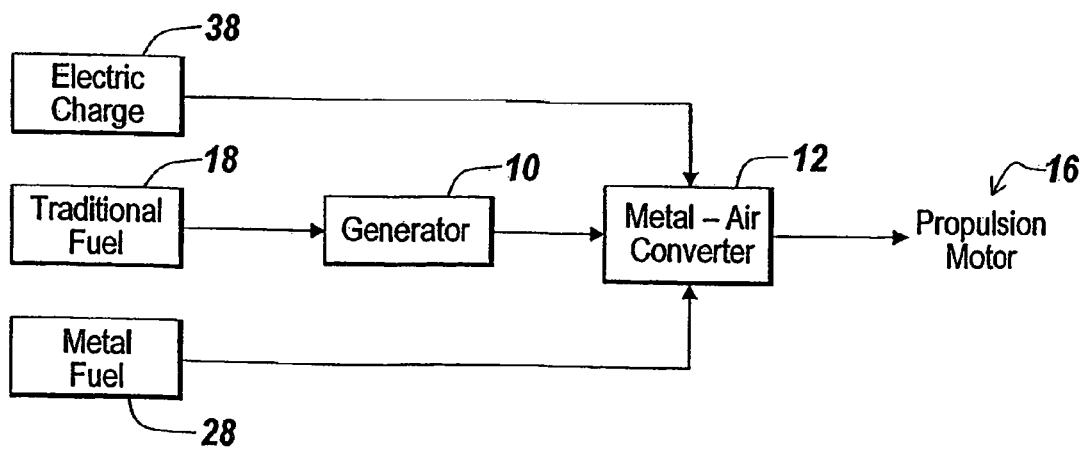
FIG. 3 is a schematic diagram of a hybrid propulsion system for the electric vehicle of FIG. 1, according to an illustrative embodiment of the invention.

As shown in FIGS. 1 and 3, an on-board generator 10 is utilized to continuously provide power for recharging a rechargeable metal-air converter 12 that powers the motor. In this regard, the generator 10 acts as a trickle charger for the metal-air battery 12. Because the generator 10 is not required as the sole source to provide full power to the drive train of the vehicle, the power rating required of the generator is advantageously reduced. The energy drain on the battery determines the steady power output of the generator. In some applications, the generator can be operated to produce more electricity than that required for operation of the vehicle or recharging the battery. This excess electricity can be delivered off-board for various uses such as, for example, household and/or commercial uses.

As schematically shown in FIG. 3, a metal-air converter 12 in the illustrative propulsion system for a vehicle according to the present invention can be used in a plurality of different modes. In the present invention, the metal-air converter 12 may be operated as a rechargeable energy source, similar to traditional batteries. The metal-air converter may also be operated as a refuelable energy source, similar to a fuel cell, by replenishing the metal fuel used to produce electricity. Alternatively, the metal-air converter may comprise an energy device that is both refuelable and rechargeable.

The present invention provides a hybrid propulsion system for a vehicle that employs a generator, such as a proton exchange membrane (PEM) type fuel cell, and a metal-air converter, which, as set forth above, can be operated as a battery. As shown in FIG. 2, the metal-air battery 12 may be recharged from an onboard power source, i.e., the generator, to extend the travel range of a vehicle. The metal-air battery may also be recharged by applying an electric charge to the metal-air battery from an off-board charging source 38. Alternatively, the metal-air battery maybe refueled from an off-board fuel source 28, which supplies new metal fuel to the battery. The use of the generator to provide on-board recharging reduces the need to take the vehicle out of commission to refuel or recharge using one of the off-board sources 28 or 38.

In the illustrative hybrid propulsion system, the metal-air converter, which can employ zinc, aluminum or magnesium metal, is operated as a battery for use in a hybrid system capable of consuming petrochemical fuels or hydrogen. The vehicle utilized the battery as a primary power source for acceleration and other demand modes, and the * generator, such as a fuel cell, as an energy source for propelling the vehicle to travel distances. Conventional batteries, such as lead-acid or NI-MH, are heavy and bulky, and hence are unsuitable for a vehicle that employs a fuel cell. When the traditional battery is replaced by a metal air converter, the vehicle is capable of storing more fuel on-board.

The Table below compares a prior art system that includes a fuel-cell in conjunction with a lead-acid battery and a system of an illustrative embodiment of the invention, comprising a fuel-cell and a zinc-air battery. One skilled in the art will recognize that the generator is not limited to a fuel cell and the metal-air converter is not limited to a zinc-air battery.

TABLE 1

|  |  | Fuel-cell/Lead-Acid | Fuel-cell/Zinc-Air |
|---|---|---|---|
| Fuel Cell Weight | lb | 500 | 500 |
| Battery Weight | lb | 500 | 50-100 |
|  |  | (lead-Acid) | (Metal-Air) |
| Fuel Storage Weight | lb | 500 | 950-900 |
| Hydrogen Fuel Weight | lb | 10 | >18 |
| Travel Range | miles | 200 | >360 |

As shown, a hybrid propulsion system comprising a fuel cell and a zinc-air battery can have a travel range of more than 360 miles, compared to the significantly lower, travel range of 200 miles for the system including a lead-acid battery. As shown, the hybrid propulsion system comprising a fuel cell and a zinc-air battery weighs substantially the same as the lead-acid battery system, but, since the zinc-air battery is much lighter than the lead-acid battery, the hybrid propulsion system comprising a fuel cell and a zinc-air battery can carry more fuel, enabling a much higher travel range. Furthermore, unlike the lead-acid battery, the zinc-air battery does not contain harmful chemicals, such as acid.

Other alterations to the above described embodiments of the invention will be readily apparent to those ordinarily skilled in the art and are intended, therefore, to be embraced within the spirit and scope of the invention. The invention is to be defined, therefore, not by the preceding description but by the claims that follow.

The invention claimed is:

1. A power supply system for powering an electric motor in an electric vehicle, the system comprising:
   a generator for converting a fuel to electricity,
   a metal-air converter electrically coupled to the electric motor and the generator for receiving electricity produced by the generator, and
   a fuel supply for supplying fuel to the generator.

2. The power supply system of claim 1, wherein the metal-air converter comprises one of a zinc-air battery, an aluminum-air battery, a magnesium-air battery, a lithium-air battery, a calcium-air battery and an iron-air battery.

3. The power supply system of claim 1, wherein said metal-air converter is adapted to be operated:
   as a rechargeable battery for receiving electricity from the generator;
   as a rechargeable battery for receiving electricity from an off board electric source; and
   as a fuel cell with replenished metal fuel.

4. The power supply system of claim 1, wherein the generator is selected from the group consisting of a fuel cell, a combustion engine, a gas turbine, and combinations thereof.

5. The power supply system of claim 1, wherein the generator comprises a hybrid power source including a gas turbine and a fuel cell.

6. The power supply system of claim 4, wherein said fuel cell is selected from the group consisting of solid oxide, solid state, molten carbonate, phosphoric acid and alkaline and proton electrolyte membrane fuel cells.

7. The power supply system of claim 1, wherein the metal-air converter has an energy density greater than 200 Wh/kg or 500 Wh/l and power density greater than 200 W/kg or 500 W/l.

8. The power supply system of claim 1, wherein the generator produces power in excess of the needs for metal-air converter recharging or on board use and can offer power for off board use.

* * * * *